US012439206B2

(12) United States Patent
Bellerjeau et al.

(10) Patent No.: US 12,439,206 B2
(45) Date of Patent: Oct. 7, 2025

(54) SYSTEMS AND METHODS FOR CASTING TO MULTIPLE WIRELESS SPEAKERS

(71) Applicant: DISH Network L.L.C., Englewood, CO (US)

(72) Inventors: Amber Bellerjeau, Littleton, CO (US); Luke E. VanDuyn, Conifer, CO (US); Caroline Condon, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 538 days.

(21) Appl. No.: 17/944,025

(22) Filed: Sep. 13, 2022

(65) Prior Publication Data

US 2024/0089656 A1 Mar. 14, 2024

(51) Int. Cl.
*H04R 3/12* (2006.01)

(52) U.S. Cl.
CPC .......... *H04R 3/12* (2013.01); *H04R 2420/07* (2013.01)

(58) Field of Classification Search
CPC .......... H04R 3/12
See application file for complete search history.

(56) References Cited

U.S. PATENT DOCUMENTS

| | | | | |
|---|---|---|---|---|
| 11,388,535 | B2 * | 7/2022 | Escande | H04W 56/001 |
| 2002/0136414 | A1 * | 9/2002 | Jordan | H04S 3/00 381/59 |
| 2010/0299639 | A1 * | 11/2010 | Ramsay | H04L 41/22 715/835 |
| 2016/0073197 | A1 * | 3/2016 | Hammer | H04W 12/50 381/80 |
| 2019/0387344 | A1 * | 12/2019 | Kim | H04R 5/04 |
| 2021/0243822 | A1 * | 8/2021 | Jones, Jr. | H04R 3/12 |

* cited by examiner

*Primary Examiner* — Olisa Anwah
(74) *Attorney, Agent, or Firm* — Perkins Coie LLP

(57) ABSTRACT

A method for casting to multiple wireless speakers, the method including: receiving at a casting device a request from a user device to cast audio signals to multiple wireless speakers, wherein the audio signals include multiple channels; sending an inquiry request; receiving responses to the inquiry request from multiple wireless speakers; connecting to a plurality of speakers from the multiple wireless speakers; sending test signals to each of the plurality of speakers; receiving information from a microphone for each of the one or more test signals output from each of the plurality of speakers, wherein the microphone is a component of a remote control associated with the casting device; selecting one or more of the multiple channels to send to each of the plurality of speakers based on the received information; and sending the corresponding selected one or more of the multiple channels to each of the plurality of speakers.

18 Claims, 6 Drawing Sheets

SYSTEMS AND METHODS FOR CASTING TO MULTIPLE WIRELESS SPEAKERS

BACKGROUND

Smart phones are capable of playing music and presenting high resolution video. However, the speakers on most smart phones are not known for high quality sound output. Wireless speakers exist that can pair with a smart phone to help improve sound. Most smart phones are limited to one or two wireless speaker connections. Thus, surround sound and multi-room sound output is limited when casting audio from a smart phone. Accordingly, there remains a need for improved speaker options for smart phones.

SUMMARY

In some aspects, the techniques described herein relate to a method for casting to multiple wireless speakers, the method including: receiving at a casting device a request from a user device to cast audio signals to multiple wireless speakers, wherein the audio signals include multiple channels; sending an inquiry request; receiving responses to the inquiry request from multiple wireless speakers; connecting to a plurality of speakers from the multiple wireless speakers; sending one or more test signals to each of the plurality of speakers; receiving information from a microphone for each of the one or more test signals output from each of the plurality of speakers, wherein the microphone is a component of a remote control associated with the casting device; selecting one or more of the multiple channels to send to each of the plurality of speakers based on the received information; and sending the corresponding selected one or more of the multiple channels to each of the plurality of speakers.

In some aspects, the techniques described herein relate to a method, wherein the casting device includes a set-top-box.

In some aspects, the techniques described herein relate to a method, wherein the received information for each of the plurality of speakers includes a frequency range.

In some aspects, the techniques described herein relate to a method, wherein the received information for each of the plurality of speakers includes a time delay between sending a test signal and receiving information from the microphone.

In some aspects, the techniques described herein relate to a method, further including providing a location recommendation for each speaker based on the received information.

In some aspects, the techniques described herein relate to a method, wherein the audio signals are received from the user device.

In some aspects, the techniques described herein relate to a system for casting to multiple wireless speakers, the system including: a remote control including a microphone; and a casting device, including: one or more processors; and one or more memory devices having stored thereon instructions that when executed by the one or more processors cause the one or more processors to: receive a request from a user device to cast audio signals to multiple wireless speakers, wherein the audio signals include multiple channels; send an inquiry request; receive responses to the inquiry request from multiple wireless speakers; connect to a plurality of speakers from the multiple wireless speakers; send one or more test signals to each of the plurality of speakers; receive information from the microphone for each of the one or more test signals output from each of the plurality of speakers; select one or more of the multiple channels to send to each of the plurality of speakers based on the received information; and send the corresponding selected one or more of the multiple channels to each of the plurality of speakers.

In some aspects, the techniques described herein relate to a system, wherein the casting device includes a set-top-box.

In some aspects, the techniques described herein relate to a system, wherein the received information for each of the plurality of speakers includes a frequency range.

In some aspects, the techniques described herein relate to a system, wherein the received information for each of the plurality of speakers includes a time delay between sending a test signal and receiving information from the microphone.

In some aspects, the techniques described herein relate to a system, further including providing a location recommendation for each speaker based on the received information.

In some aspects, the techniques described herein relate to a system, wherein the audio signals are received from the user device.

In some aspects, the techniques described herein relate to one or more non-transitory computer-readable media storing computer-executable instructions that, when executed by one or more processors, cause the one or more processors to perform operations including: receiving at a casting device a request from a user device to cast audio signals to multiple wireless speakers, wherein the audio signals include multiple channels; sending an inquiry request; receiving responses to the inquiry request from multiple wireless speakers; connecting to a plurality of speakers from the multiple wireless speakers; sending one or more test signals to each of the plurality of speakers; receiving information from a microphone for each of the one or more test signals output from each of the plurality of speakers, wherein the microphone is a component of a remote control associated with the casting device; selecting one or more of the multiple channels to send to each of the plurality of speakers based on the received information; and sending the corresponding selected one or more of the multiple channels to each of the plurality of speakers.

In some aspects, the techniques described herein relate to one or more non-transitory computer-readable media, wherein the casting device includes a set-top-box.

In some aspects, the techniques described herein relate to one or more non-transitory computer-readable media, wherein the received information for each of the plurality of speakers includes a frequency range.

In some aspects, the techniques described herein relate to one or more non-transitory computer-readable media, wherein the received information for each of the plurality of speakers includes a time delay between sending a test signal and receiving information from the microphone.

In some aspects, the techniques described herein relate to one or more non-transitory computer-readable media, further including providing a location recommendation for each speaker based on the received information.

In some aspects, the techniques described herein relate to one or more non-transitory computer-readable media, wherein the audio signals are received from the user device.

BRIEF DESCRIPTION OF THE DRAWINGS

The systems and methods described herein may be better understood by referring to the following Detailed Description in conjunction with the accompanying drawings, in which like reference numerals indicate identical or functionally similar elements.

Figure 1:
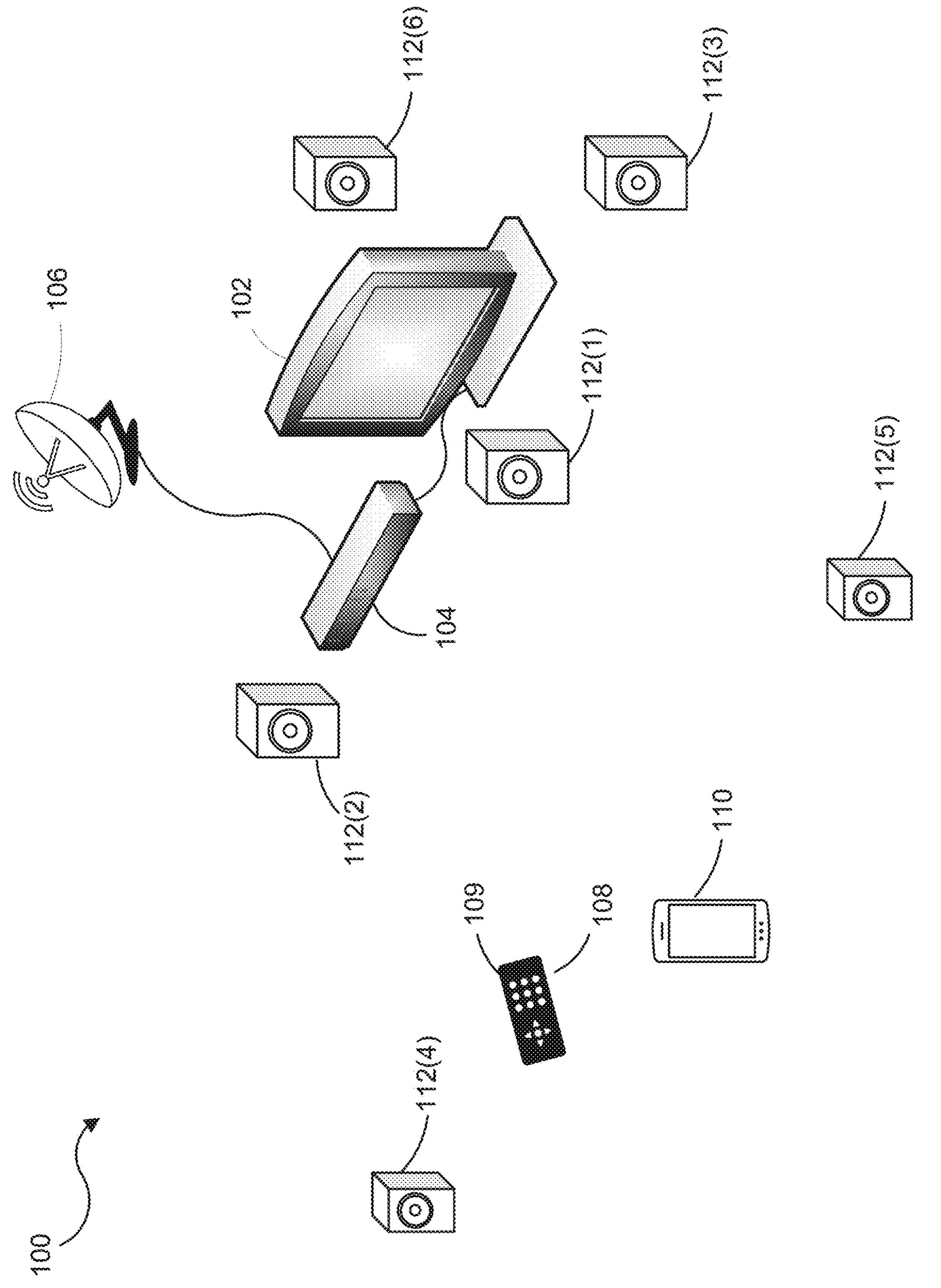
FIG. 1 is a diagram illustrating an overview of a system for casting audio to multiple wireless speakers according to embodiments of the disclosed technology.

The headings provided herein are for convenience only and do not necessarily affect the scope of the embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to unnecessarily limit the embodiments described. On the contrary, the embodiments are intended to cover all suitable modifications, combinations, equivalents, and alternatives falling within the scope of this disclosure.

DETAILED DESCRIPTION

Various examples of the systems and methods introduced above will now be described in further detail. The following description provides specific details for a thorough understanding and enabling description of these examples. One skilled in the relevant art will understand, however, that the techniques and technology discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

FIG. 1 illustrates a simplified block diagram of a system 100 for casting to wireless speakers 112(1)-112(6) (collectively speakers 112) from a user device 110. The system 100 can include a casting device 104 and a remote control 108 associated with the casting device 104. The user device 110 can be a desktop computer or a mobile device, such as a cellular telephone, a laptop, a tablet computer, a smartwatch, or any other mobile device.

In some embodiments the casting device 104 can be a set-top-box (STB). The STB can be in communication with a television 102 and a satellite-based television distribution system via a satellite dish 106, for example. Satellite-based television distribution systems often include one or more satellites and satellite transmission equipment (not shown).

Although the system is described with respect to a satellite-based distribution system, cable, IP-based, wireless, and broadcast focused systems are also possible. In some embodiments, the STB can have capabilities of a conventional STB along with Wi-Fi gateway capability and multiple Bluetooth® speaker capability (e.g., more than two).

The casting device 104 can be configured to receive a request from the user device 110 to cast audio signals to the plurality of wireless speakers 112. The audio signals can be in the form of music, or sound associated with video, such as a movie. The audio signals can include multiple channels for e.g., surround sound. In some embodiments, where the audio signals are associated with video, the casting device (i.e., STB) 104 can also receive video signals from the user device 110 for display on the television 102, or other suitable display device.

The wireless speakers 112 can be from different manufacturers and/or a part of other devices. In one example, the speakers 112 belong to different people attending an event (e.g., a party). Thus, speakers 112 are unrelated to each other except for all being a wireless speaker. In some cases, the speakers can be part of another mobile device (e.g., smart phone).

In some embodiments, the speakers 112 can be initially placed in a conventional surround sound configuration. For a party setting with music, each speaker can be positioned in a different room, for example. Once the casting device 104 receives a request from the user device 110 to cast audio signals, the casting device 104 can connect to the plurality of speakers 112. During the connection process each speaker 112 can respond with its address, name, and other information, for example. In some cases the system can determine which type of speaker it is (e.g., bass, midrange, treble, etc.) from its name and/or other information. In some embodiments, the system can retrieve speaker information based on the name or a model number from information on the internet or a database of speaker specifications.

In some embodiments, the casting device 104 sends one or more test signals to each of the plurality of speakers 112. As each speaker 112 plays these test signals a microphone 109 on the remote control 108 picks up the sound it makes. The remote control 108 can send this information to the casting device 104. From this information, the casting device 104 can determine sound output characteristics for each speaker, such as frequency range (e.g., bass, midrange, treble, etc.) and time delay, for example. The system selects one or more of the multiple channels to send to each of the plurality of speakers based on the received information.

Each speaker can be categorized into one or more categories based on its ability to reproduce frequencies in selected ranges. For example, the ranges can include Sub bass: 20-60 Hz, Bass: 60-250 Hz, Low Midrange: 250 to 500 Hz, Midrange: 500 Hz to 2 kHz, Upper Midrange: 2 to 4 kHz, Presence: 4 kHz to 6 kHz, and Brilliance: 6 kHz to 20 kHz. In some embodiments, the system selects one or more of the multiple channels to send to each of the plurality of speakers based on the speaker's category. For example, a speaker 112(6) with a response in the sub-bass range can be selected for the subwoofer channel; speakers 112(2) and 112(3) with a response in the low midrange can be selected as the front channels; a speaker 112(1) with a response in the midrange can be selected as the center channel; and speakers 112(4) and 112(5) with a response in the upper midrange can be selected as the rear channels. The disclosed category frequency ranges and example surround speaker locations are only examples and other ranges and locations can be used.

The system can also provide a location recommendation for each speaker based on the received information. For example, the system can recommend placing each speaker in the conventional surround sound (e.g., Dolby® 5.1 surround) location for the corresponding selected channel. In some embodiments, the system sends a signal to each speaker so that it outputs the name of the recommended location, such as “front,” “center,” or “rear.”

Figure 2:
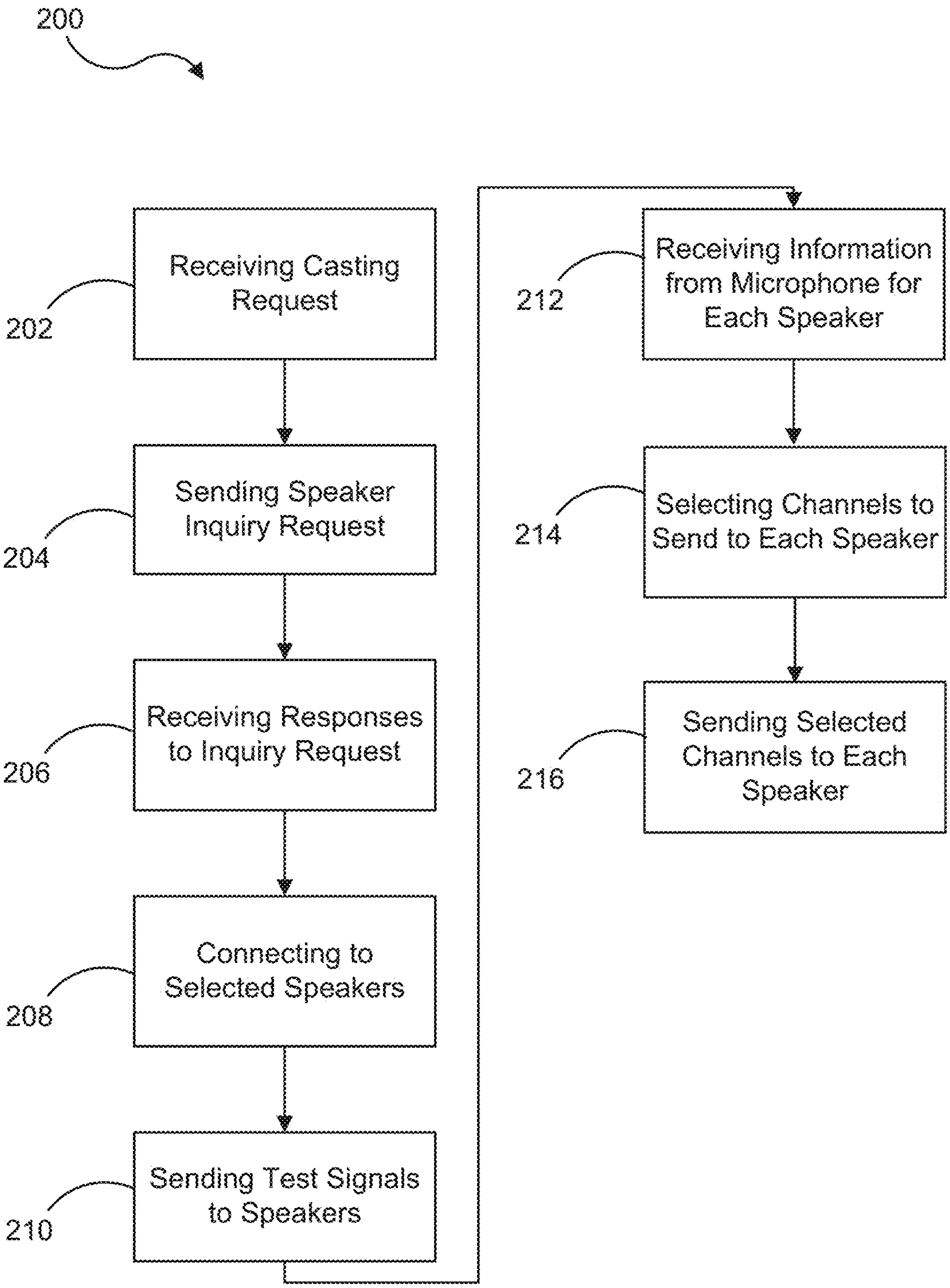
FIG. 2 is a flow diagram showing a method for casting to multiple wireless speakers according to some embodiments of the disclosed technology.

FIG. 2 is a flow diagram showing a representative method of operation 200 of a processor-based system for casting to multiple wireless speakers according to some embodiments of the disclosed technology. The method can include, at step 202, receiving at a casting device a request from a user device to cast audio signals to multiple wireless speakers. The audio signals can include multiple channels, such as surround sound channels. At step 204, the method includes sending a speaker inquiry request. The casting device receives responses to the inquiry request from multiple wireless speakers at step 206. At step 208, the method includes connecting to a plurality of speakers from the multiple wireless speakers that responded. In some embodiments, the pairing process can be managed via an app on the mobile device or through settings/setup on the casting device. In some embodiments, the system follows the Bluetooth® pairing protocol. Some responding speakers may not be suitable or may have characteristics that are duplicative of other speakers. In other words, not all of the responding speakers are necessarily connected for casting the audio signals.

In some embodiments, one or more test signals are sent to each of the plurality of speakers at step 210. At step 212, the method includes receiving information from a microphone for each of the one or more test signals output from each of the plurality of speakers, wherein the microphone is a component of a remote control associated with the casting device. In some embodiments, the received information for each of the plurality of speakers includes a frequency range and a time delay between sending a test signal and receiving information from the microphone. At step 214, one or more of the multiple channels are selected to send to each of the plurality of speakers based on the received information. At step 216, the method includes sending the corresponding selected one or more of the multiple channels to each of the plurality of speakers. In some embodiments the method can further comprise providing a location recommendation for each speaker based on the received information.

Figure 3:
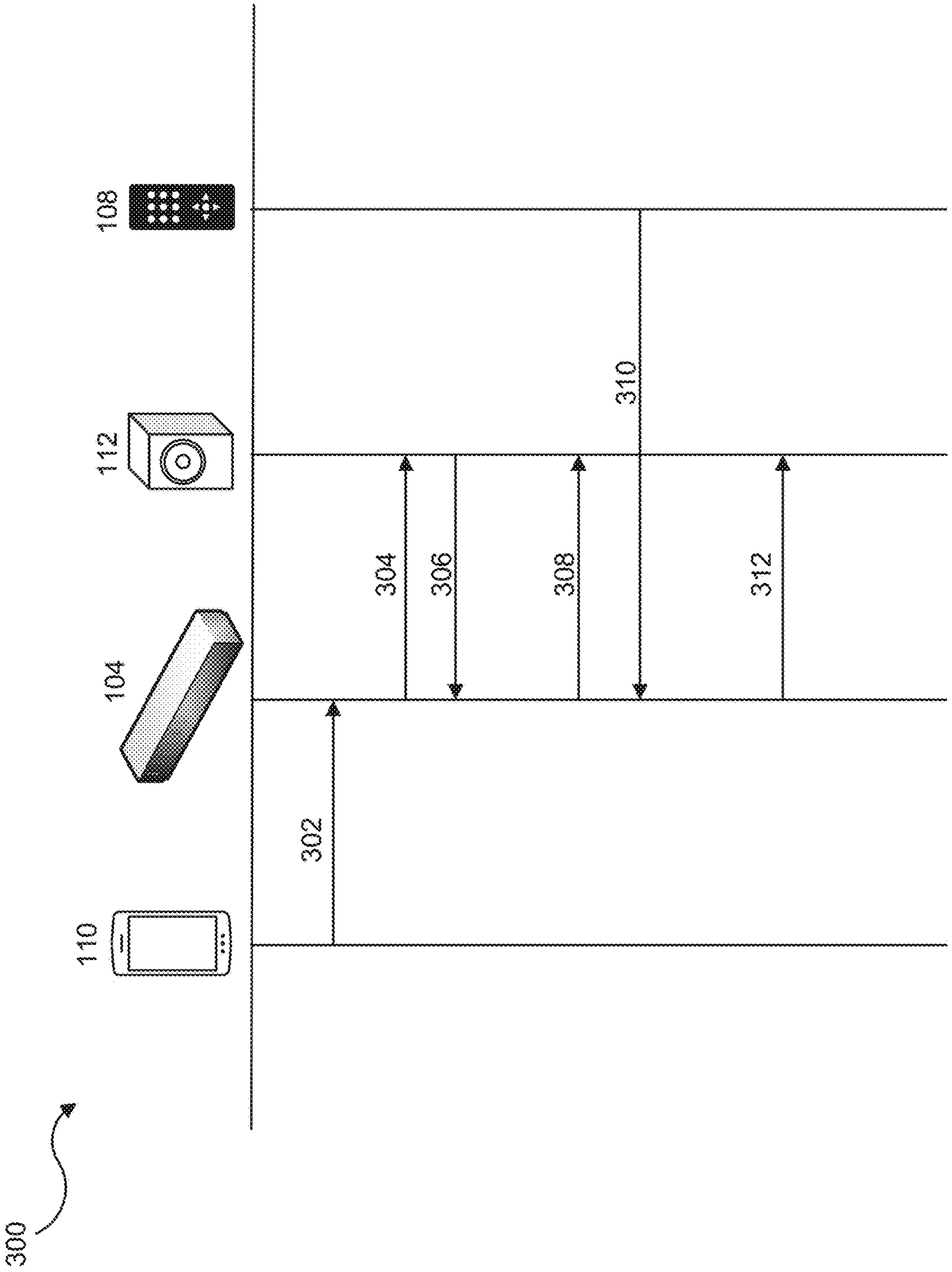
FIG. 3 is a sequence diagram illustrating information flow between system components according to some embodiments of the disclosed technology.

FIG. 3 is a sequence diagram 300 illustrating information flow between system components e.g., casting device 104, remote control 108, mobile device 110, and speaker(s) 112. The casting device 104 receives a request 302 from a user device 110 to cast audio signals to multiple wireless speakers. The casting device 104 sends a speaker inquiry request 304 to any speakers 112 in range of the casting device 104. The casting device 104 receives responses 306 from the wireless speakers 112. The casting device 104 sends test signals 308 to each speaker 112. The remote control 108 sends information 310 for each of the test signals output from each of the plurality of speakers 112. Once the casting device 104 determines which audio channels to send to each speaker 112 based on the information 310 received from the remote control 108, the casting device 104 sends the audio channels 312 to the corresponding speakers 112.

Suitable System

The techniques disclosed herein can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to cause a computer, a microprocessor, processor, and/or microcontroller (or other electronic devices) to perform a process. The machine-readable medium may include, but is not limited to, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

Figure 4:
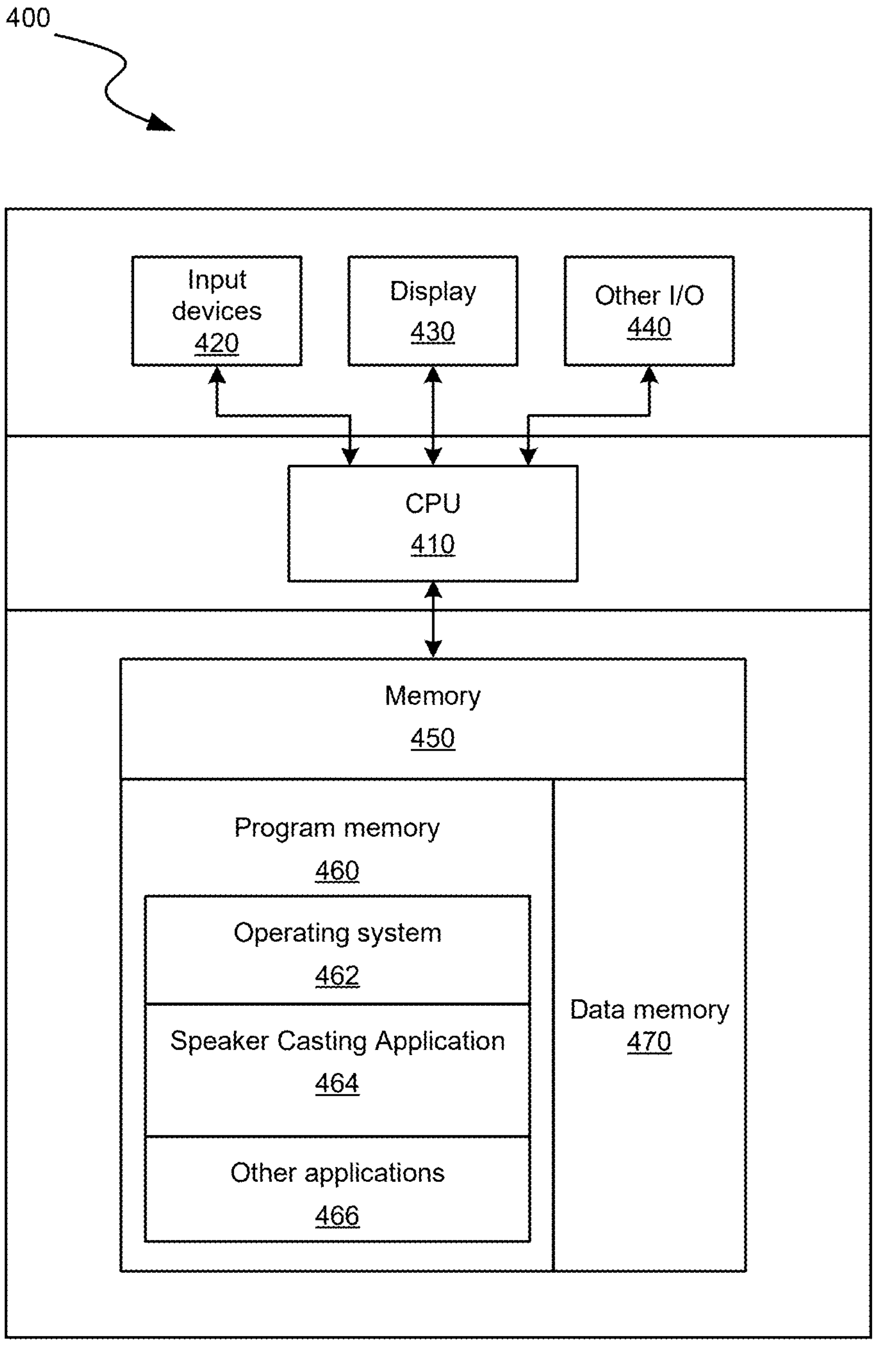
FIG. 4 is a block diagram illustrating an overview of devices on which some implementations can operate.

Several implementations are discussed below in more detail in reference to the figures. FIG. 4 is a block diagram illustrating an overview of devices on which some implementations of the disclosed technology can operate. The devices can comprise hardware components of a device 400. Device 400 can include one or more input devices 420 that provide input to the CPU (processor) 410, notifying it of actions. The actions are typically mediated by a hardware controller that interprets the signals received from the input device and communicates the information to the CPU 410 using a communication protocol. Input devices 420 include, for example, a mouse, a keyboard, a touchscreen, an infrared sensor, a touchpad, a wearable input device, a camera- or image-based input device, a microphone, or other user input devices.

CPU 410 can be a single processing unit or multiple processing units in a device or distributed across multiple devices. CPU 410 can be coupled to other hardware devices, for example, with the use of a bus, such as a PCI bus or SCSI bus. The CPU 410 can communicate with a hardware controller for devices, such as for a display 430. Display 430 can be used to display text and graphics. In some examples, display 430 provides graphical and textual visual feedback to a user. In some implementations, display 430 includes the input device as part of the display, such as when the input device is a touchscreen or is equipped with an eye direction monitoring system. In some implementations, the display is separate from the input device. Examples of display devices are: televisions; mobile devices; an LCD display screen; an LED display screen; a projected, holographic, or augmented reality display (such as a heads-up display device or a head-mounted device); and so on. Other I/O devices 440 can also be coupled to the processor, such as a network card, video card, audio card, USB, FireWire or other external device, camera, printer, speakers, CD-ROM drive, DVD drive, disk drive, or Blu-Ray device.

In some implementations, the device 400 also includes a communication device capable of communicating wirelessly or wire-based with a network node. The communication device can communicate with another device or a server through a network using, for example, TCP/IP protocols. Device 400 can utilize the communication device to distribute operations across multiple network devices.

The CPU 410 can have access to a memory 450. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 450 can include program memory

460 that stores programs and software, such as an operating system 462, a multiple wireless speaker casting application 464, and other application programs 466. Memory 450 can also include data memory 470 that can include speaker information, etc., which can be provided to the program memory 460 or any element of the device 400.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, mobile phones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 5:
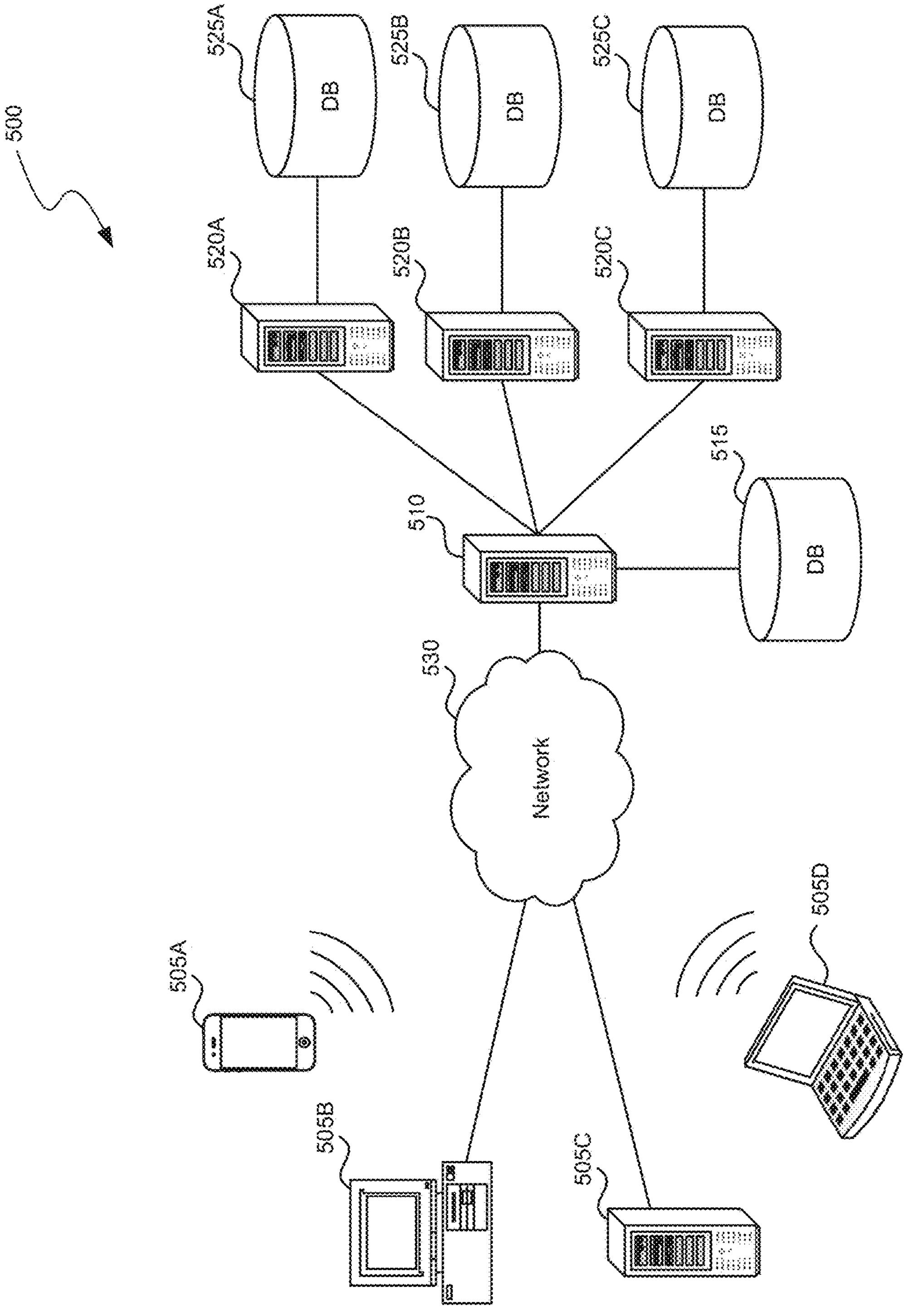
FIG. 5 is a block diagram illustrating an overview of an environment in which some implementations can operate.

FIG. 5 is a block diagram illustrating an overview of an environment 500 in which some implementations of the disclosed technology can operate. Environment 500 can include one or more client computing devices 505A-D, examples of which can include device 400. Client computing devices 505 can operate in a networked environment using logical connections through network 530 to one or more remote computers, such as a server computing device 510.

In some implementations, server computing device 510 can be an edge server that receives client requests and coordinates fulfillment of those requests through other servers, such as servers 520A-C. Server computing devices 510 and 520 can comprise computing systems, such as device 400. Though each server computing device 510 and 520 is displayed logically as a single server, server computing devices can each be a distributed computing environment encompassing multiple computing devices located at the same or at geographically disparate physical locations. In some implementations, each server computing device 520 corresponds to a group of servers.

Client computing devices 505 and server computing devices 510 and 520 can each act as a server or client to other server/client devices. Server 510 can connect to a database 515. Servers 520A-C can each connect to a corresponding database 525A-C. As discussed above, each server 520 can correspond to a group of servers, and each of these servers can share a database or can have their own database. Databases 515 and 525 can warehouse (e.g., store) information such as speaker information, speaker characteristics (e.g., frequency range and/or timing delay), channel selections, and/or user preferences. Though databases 515 and 525 are displayed logically as single units, databases 515 and 525 can each be a distributed computing environment encompassing multiple computing devices, can be located within their corresponding server, or can be located at the same or at geographically disparate physical locations.

Network 530 can be a local area network (LAN) or a wide area network (WAN), but can also be other wired or wireless networks. Network 530 may be the Internet or some other public or private network. Client computing devices 505 can be connected to network 530 through a network interface, such as by wired or wireless communication. While the connections between server 510 and servers 520 are shown as separate connections, these connections can be any kind of local, wide area, wired, or wireless network, including network 530 or a separate public or private network.

Figure 6:
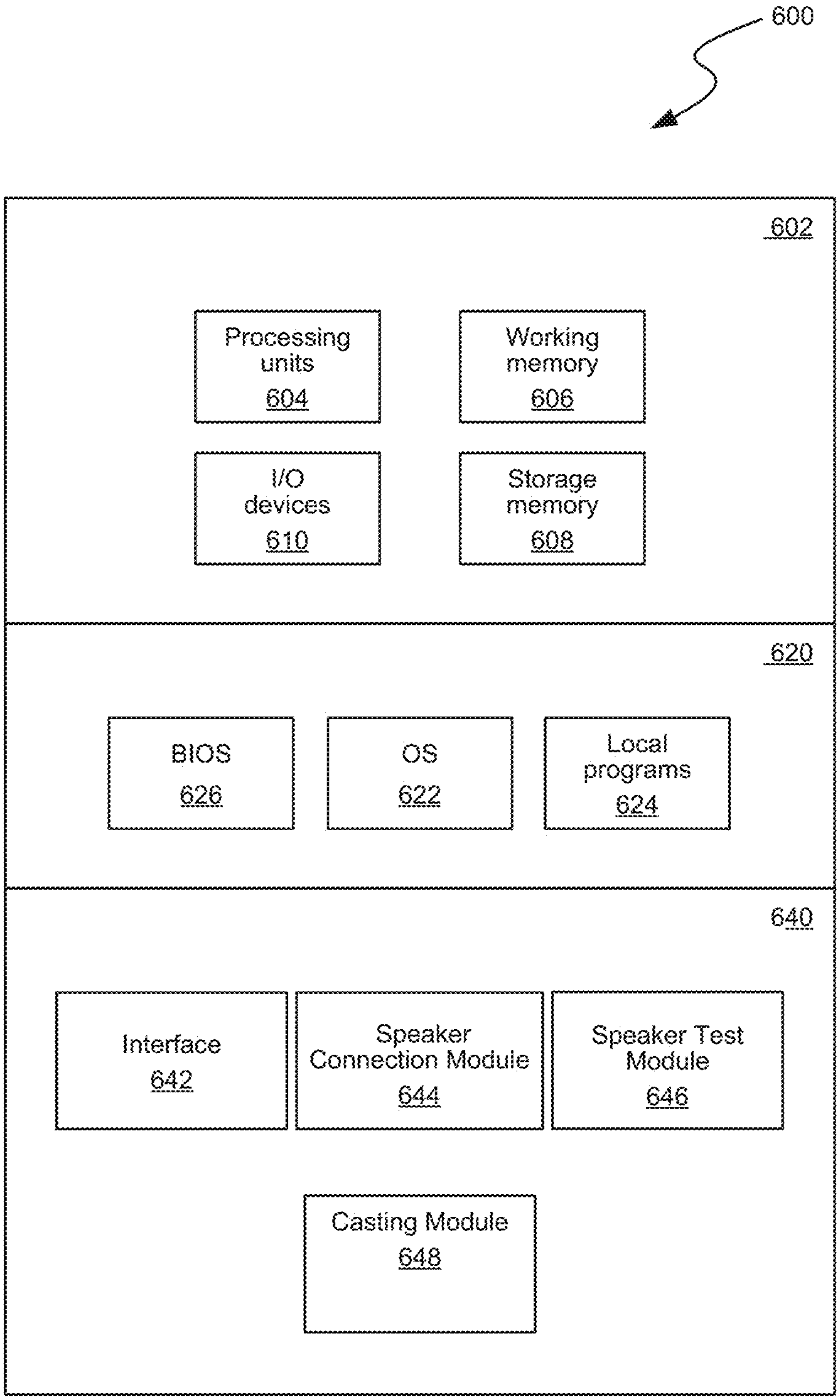
FIG. 6 is a block diagram illustrating components which, in some implementations, can be used in a system employing the disclosed technology.

FIG. 6 is a block diagram illustrating components 600 which, in some implementations, can be used in a system employing the disclosed technology. The components 600 include hardware 602, general software 620, and specialized components 640. As discussed above, a system implementing the disclosed technology can use various hardware, including processing units 604 (e.g., CPUs, GPUs, APUs, etc.), working memory 606, storage memory 608, and input and output devices 610. Components 600 can be implemented in a client computing device such as client computing devices 505 or on a server computing device, such as server computing device 510 or 520.

General software 620 can include various applications, including an operating system 622, local programs 624, and a basic input output system (BIOS) 626. Specialized components 640 can be subcomponents of a general software application 620, such as local programs 624. Specialized components 640 can include a Speaker Connection module 644, Speaker Test module 646, Casting module 648, and components that can be used for transferring data and controlling the specialized components, such as interface 642. In some implementations, components 600 can be in a computing system that is distributed across multiple computing devices or can be an interface to a server-based application executing one or more of specialized components 640.

Those skilled in the art will appreciate that the components illustrated in FIGS. 4-6 described above, and in each of the flow diagrams discussed above, may be altered in a variety of ways. For example, the order of the logic may be rearranged, sub steps may be performed in parallel, illustrated logic may be omitted, other logic may be included, etc. In some implementations, one or more of the components described above can execute one or more of the processes described below.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

What is claimed is:

1. A method for casting to multiple wireless speakers, the method comprising:

receiving at a casting device a request from a user device to cast audio signals to multiple wireless speakers in an environment, wherein the audio signals include multiple channels;

sending an inquiry request;

receiving responses to the inquiry request from the multiple wireless speakers;

connecting to a plurality of speakers from the multiple wireless speakers;

sending one or more test signals to each of the plurality of speakers;

receiving information from a microphone for each of the one or more test signals output from each of the plurality of speakers, wherein the microphone is a component of a remote control associated with the casting device;

selecting one or more of the multiple channels to send to each of the plurality of speakers based on the received information;

sending the corresponding selected one or more of the multiple channels to each of the plurality of speakers; and sending one or more signals to each of the plurality of speakers to output a location notification for where each speaker is recommended to be located within the environment.

2. The method of claim 1, wherein the casting device comprises a set-top-box.

3. The method of claim 1, wherein the received information for each of the plurality of speakers includes a frequency range.

4. The method of claim 1, wherein the received information for each of the plurality of speakers includes a time delay between sending a test signal and receiving information from the microphone.

5. The method of claim 1, further comprising providing a location recommendation for each speaker based on the received information.

6. The method of claim 1, wherein the audio signals are received from the user device.

7. A system for casting to multiple wireless speakers, the system comprising:

a remote control including a microphone; and a casting device, comprising:

one or more processors; and one or more memory devices having stored thereon instructions that when executed by the one or more processors cause the one or more processors to:

receive a request from a user device to cast audio signals to multiple wireless speakers in an environment, wherein the audio signals include multiple channels;

send an inquiry request;

receive responses to the inquiry request from the multiple wireless speakers;

connect to a plurality of speakers from the multiple wireless speakers;

send one or more test signals to each of the plurality of speakers;

receive information from the microphone for each of the one or more test signals output from each of the plurality of speakers;

select one or more of the multiple channels to send to each of the plurality of speakers based on the received information;

send the corresponding selected one or more of the multiple channels to each of the plurality of speakers; and send one or more signals to each of the plurality of speakers to output a location notification for where each speaker is recommended to be located within the environment.

8. The system of claim 7, wherein the casting device comprises a set-top-box.

9. The system of claim 7, wherein the received information for each of the plurality of speakers includes a frequency range.

10. The system of claim 7, wherein the received information for each of the plurality of speakers includes a time delay between sending a test signal and receiving information from the microphone.

11. The system of claim 7, further comprising providing a location recommendation for each speaker based on the received information.

12. The system of claim 7, wherein the audio signals are received from the user device.

13. One or more non-transitory computer-readable media storing computer-executable instructions that, when executed by one or more processors, cause the one or more processors to perform operations comprising:

receiving at a casting device a request from a user device to cast audio signals to multiple wireless speakers in an environment, wherein the audio signals include multiple channels;

sending an inquiry request;

receiving responses to the inquiry request from the multiple wireless speakers;

connecting to a plurality of speakers from the multiple wireless speakers;

sending one or more test signals to each of the plurality of speakers;

receiving information from a microphone for each of the one or more test signals output from each of the plurality of speakers, wherein the microphone is a component of a remote control associated with the casting device;

selecting one or more of the multiple channels to send to each of the plurality of speakers based on the received information;

sending the corresponding selected one or more of the multiple channels to each of the plurality of speakers, and sending one or more signals to each of the plurality of speakers to output a location notification for where each speaker is recommended to be located within the environment.

14. The one or more non-transitory computer-readable media of claim 13, wherein the casting device comprises a set-top-box.

15. The one or more non-transitory computer-readable media of claim 13, wherein the received information for each of the plurality of speakers includes a frequency range.

16. The one or more non-transitory computer-readable media of claim 13, wherein the received information for each of the plurality of speakers includes a time delay between sending a test signal and receiving information from the microphone.

17. The one or more non-transitory computer-readable media of claim 13, further comprising providing a location recommendation for each speaker based on the received information.

18. The one or more non-transitory computer-readable media of claim 13, wherein the audio signals are received from the user device.

* * * * *